US010883774B2

(12) United States Patent
 Rauch et al.

(10) Patent No.: US 10,883,774 B2
(45) Date of Patent: Jan. 5, 2021

(54) COOLED CONVEYOR FOR DECOATING SYSTEMS

(71) Applicant: Novelis Inc., Atlanta, GA (US)

(72) Inventors: Edwin L. Rauch, Fulton, NY (US); JungYoung Son, Ulsan (KR)

(73) Assignee: NOVELIS INC., Atlanta, GA (US)

( * ) Notice: Subject to any disclaimer, the term of this patent is extended or adjusted under 35 U.S.C. 154(b) by 222 days.

(21) Appl. No.: 15/990,004

(22) Filed: May 25, 2018

(65) Prior Publication Data

US 2018/0340745 A1 Nov. 29, 2018

Related U.S. Application Data

(60) Provisional application No. 62/511,381, filed on May 26, 2017.

(51) Int. Cl.
| | |
|---|---|
| *F28F 5/06* | (2006.01) |
| *F27D 17/00* | (2006.01) |
| *F27D 3/08* | (2006.01) |
| *C22B 21/00* | (2006.01) |
| *B01D 45/16* | (2006.01) |
| *B65G 33/26* | (2006.01) |
| *C22B 1/00* | (2006.01) |

(52) U.S. Cl.
CPC ............... *F28F 5/06* (2013.01); *B01D 45/16* (2013.01); *B65G 33/26* (2013.01); *C22B 1/005* (2013.01); *C22B 21/0007* (2013.01); *F27D 3/08* (2013.01); *F27D 17/004* (2013.01)

(58) Field of Classification Search
CPC .... C22B 7/00; C22B 7/02; C22B 7/04; C22B 1/26; C22B 1/005; C22B 21/0069; C22B 21/0007; F28F 5/06; B01J 8/0055; Y02P 10/212; Y02P 10/283; F27D 17/004; F27D 3/08; B01D 45/16
See application file for complete search history.

(56) References Cited

U.S. PATENT DOCUMENTS 5,186,622 A * 2/1993 Gillespie .................. F27B 7/42
432/13
2005/0252636 A1 11/2005 Kauppila et al.
(Continued)

FOREIGN PATENT DOCUMENTS

DE 3320595 A1 * 12/1984 ............. C10B 33/00
GB 812986 A * 5/1959 ................ F28F 5/06
(Continued)

OTHER PUBLICATIONS

International Search Report and Written Opinion issued for Application No. PCT/US2018/034612 dated Aug. 3, 2018, 13 pages.
(Continued)

*Primary Examiner* — Tho V Duong
(74) *Attorney, Agent, or Firm* — Kilpatrick Townsend & Stockton LLP

(57) ABSTRACT

A decoating system includes a dust cyclone and cooled conveyor. The dust cyclone is configured to receive an exhaust gas from a decoating kiln, filter organic particulate matter from the exhaust gas as dust, and discharge the dust at a discharge temperature. The cooled conveyor is configured to receive the dust from the dust cyclone and cool the dust to a dust processing temperature that is less than the spontaneous reaction temperature.

15 Claims, 6 Drawing Sheets

(56) References Cited

U.S. PATENT DOCUMENTS

| | | | | |
|---|---|---|---|---|
| 2010/0051233 A1* | 3/2010 | Whitney | ............... | F26B 3/24 |
| | | | | 165/87 |
| 2011/0314728 A1* | 12/2011 | Camper | ............... | C10L 5/445 |
| | | | | 44/606 |
| 2014/0147799 A1 | 5/2014 | Peterman et al. | | |
| 2016/0068771 A1* | 3/2016 | Appel | ............... | C10B 53/02 |
| | | | | 422/187 |

FOREIGN PATENT DOCUMENTS

| | | | |
|---|---|---|---|
| JP | H11226352 A | 8/1999 | |
| JP | 2000015214 A | 1/2000 | |
| JP | 2000513764 A | 10/2000 | |
| JP | 2001108209 A | 4/2001 | |
| JP | 2001153328 A | 6/2001 | |
| JP | 2003112157 A | 4/2003 | |
| JP | 2007155231 A | 6/2007 | |
| JP | 2008196711 A | 8/2008 | |
| JP | 2011098264 A | 5/2011 | |
| JP | 2012011299 A | 1/2012 | |
| JP | 2015147985 A | 8/2015 | |
| JP | 2016044905 A | 4/2016 | |

OTHER PUBLICATIONS

International Patent Application No. PCT/US2018/034612 , "International Preliminary Report on Patentability", dated Dec. 5, 2019, 8 pages.
Japanese Patent Application No. 2019-564072, Office Action, dated Sep. 23, 2020, 19 pages.

* cited by examiner

COOLED CONVEYOR FOR DECOATING SYSTEMS

REFERENCE TO RELATED APPLICATIONS

This application claims the benefit of U.S. Provisional Application No. 62/511,381, filed on May 26, 2017 and entitled COOLED CONVEYOR FOR DECOATING SYSTEMS, the disclosure of which are hereby incorporated by reference in its entirety.

FIELD OF THE INVENTION

This application relates to metal recycling, and more particularly to decoating systems for metal recycling.

BACKGROUND

During metal recycling, metal scrap (such as aluminum or aluminum alloys) are crushed, shredded, chopped, or otherwise reduced into smaller pieces of metal scrap. Oftentimes, the metal scrap has various coatings, such as oils, paints, lacquers, plastics, inks, and glues, as well as various other organic contaminants such as paper, plastic bags, polyethylene terephthalate (PET), sugar residues, etc., that must be removed through a decoating process before the metal scrap can be further processed and recovered.

During decoating with a decoating system, the non-volatile organic compounds are thermally cracked and some of the organic compounds are condensed and removed as dust, along with other finely divided materials (aluminum fines, clay, glass, various inorganic materials such as pigments, etc.), through a dust cyclone of the decoating system. Because this dust contains a high concentration of organic compounds and other combustibles such as metallic powder and is at an elevated temperature (due to the decoating process), the dust is susceptible to combustion and the creation of dust fires when it is discharged from the decoating system. These fires are very difficult to extinguish, even with water or fire extinguishers. Moreover, if water were used to wet the dust to make a slurry mixture of the water and dust, the mixture may be costly to dispose of due to the content of the slurry mixture, the process may be costly to implement because of the quantity of water needed on a daily basis, and the mixture may present potential safety and environmental issues.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In various examples, a decoating system includes a dust cyclone (or other suitable solid/gas separator) and a cooled conveyor. The dust cyclone is configured to receive an exhaust gas from a decoating kiln, filter particulate matter from the exhaust gas as dust, and discharge the dust at a reduced discharge temperature. In some examples, the cooled conveyor includes one or more screw(s) rotatably positioned in a trough. At least one of the screws or the trough is internally or externally cooled with a coolant. The cooled conveyor is configured to receive the dust from the dust cyclone and cool the dust to a dust processing temperature that is less than the cyclone temperature. In various examples, the cyclone temperature may correspond to temperatures at which the dust is susceptible to spontaneously combust.

In some examples, a method of cooling dust from a dust cyclone of a decoating system includes extracting the dust containing organic particulate matter from the dust cyclone of the decoating system and into a cooled conveyor. The method also includes advancing the dust along the trough with the screw and cooling the dust from a cyclone temperature to a dust processing temperature with the cooled conveyor.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
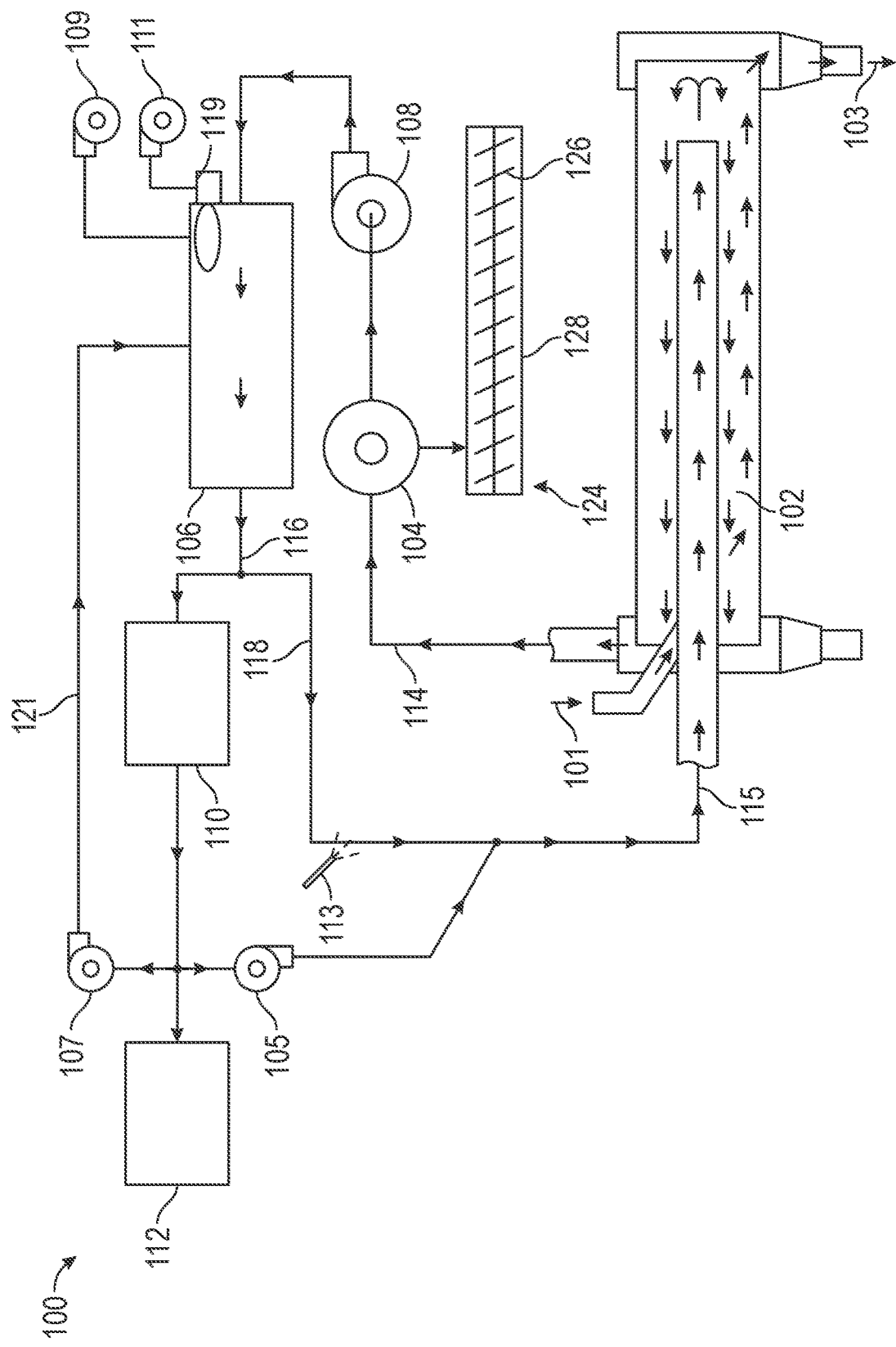
FIG. 1 is a schematic diagram depicting a decoating system including a cooled screw conveyor according to aspects of the present disclosure.

FIG. 1 illustrates a decoating system 100 for removing coatings from metal scrap, such as aluminum or aluminum alloys, according to examples of the present disclosure. The decoating system 100 generally includes a kiln 102, a cyclone 104 (or other suitable solid/gas separator), and an afterburner 106. Other components such as a recirculation fan 108, a heat exchanger 110, and exhaust system 112 may be included as part of the decoating system 100. As described in detail below, the decoating system includes a cooled conveyor 124 that receives the dust from the cyclone 104 and reduces the temperature of the dust from a cyclone temperature to a dust processing temperature.

During a decoating process using the decoating system 100, metal scrap 101 is fed into the kiln 102. Heated gas 115 is injected into the kiln 102 to raise the temperature within the kiln 102 and vaporize and/or thermally crack the organic contaminants without melting the scrap metal. In many cases, the oxygen concentration within the decoating system 100 is maintained at a low level (such as from about 6% to about 8% oxygen) such that the organic coatings do not ignite. For example, within the decoating system, the atmosphere may be 7% oxygen such that the organic compounds do not ignite even though they are at elevated temperatures due to the decoating process. The decoated scrap metal 103 is removed from the kiln 102 for further processing and ultimately processing into new aluminum products. As the scrap progresses through the kiln 102, it is heated by the gases, thereby cooling said gases. This thermal profile results in certain organic compounds that had previously vaporized to re-condense onto the surface of particulate matter.

Exhaust gas containing the vaporized organic compounds and particulate matter exits the kiln 102 through a duct 114, which connects the kiln 102 to the cyclone 104 (or other suitable solid/gas separator). Within the cyclone 104, larger particulates containing condensed organic compounds are removed from the exhaust gas as dust and ultimately discharged from the cyclone 104 for disposal. The particulate matter is composed of various metallic and non-metallic solids as well as carbonaceous material. From the cyclone 104, the exhaust gas is directed into the afterburner 106. The afterburner 106 incinerates the remaining organic compounds within the exhaust gas, and discharges a heated gas into a duct 116 that ultimately leads to the exhaust system 112 (e.g., a baghouse), the atmosphere or back into the kiln 102. The afterburner 106 may include a hot air burner 119 or other suitable device for heating the gas. The temperature of the heated gas within the duct 116 is greater than the temperature of the exhaust gas from the kiln 102 within the duct 114. For example, in various cases, the temperature of the exhaust gas within the duct 114 is generally from about 250° C. to about 400° C., while the temperature of the heated gas within the duct 116 is generally from about 700° C. to about 900° C. Some of the heated gas is optionally recirculated back to the kiln 102 through a recirculation duct 118. In various examples, cooling devices 113 (such as water sprayers) are provided to cool a temperature of the heated gas from the afterburner 106 before the gas is recirculated back to the kiln 102.

As illustrated in FIG. 1, in some examples, the exhaust gas exiting the afterburner 106 through the duct 116 is directed through the heat exchanger 110 that reduces a temperature of the exhaust gas. In various examples, some of the cooled exhaust air exiting the heat exchanger 110 may be recirculated through a gas mover 105 back to the kiln 102. Alternatively or additionally, some of the cooled exhaust air exiting the heat exchanger 110 may be recirculated through a gas mover 107 back to the afterburner 106 as cooling air 121 to prevent overheating when excessive organic compounds are being processed, while still controlling the atmosphere within the afterburner 106. In various examples, additional gas movers 109 and 111 are provided to supply oxygen to combust the organic compounds and control the atmosphere within the afterburner 106 (gas mover 109) and burner combustion air (gas mover 111).

Traditionally, dust discharged from the cyclone 104 is collected with a bin or hopper. The dust discharged from the cyclone 104 and retained within the hopper is susceptible to combustion and the formation of fires because the dust exits the cyclone at a relatively high temperature and it can contain low temperature ignition compounds and catalyzing materials and compounds. This is exacerbated by the dust particles being loosely packed, the rate of air ingress into a pile of dust is relatively high (i.e., more air can infiltrate a pile of dust such that more dust is in contact with air), and the rate of heat conduction away from a local reaction site is relatively low. These dust fires are very difficult to extinguish, even with water or fire extinguishers. Moreover, if water were used to wet the dust to make a slurry mixture of the water and dust, the mixture may be costly to dispose of due to the content of the slurry mixture as well as the volume of the material. The process may further be costly to implement because of the quantity of water needed on a daily basis, and the mixture may present potential safety and environmental issues.

As illustrated in FIG. 1, the decoating system 100 includes the cooled conveyor 124, which receives the dust from the cyclone 104 and reduces the temperature of the dust from a cyclone temperature to a dust processing temperature. The dust discharged from the cyclone 104 is generally at a discharge temperature of from about 250° C. to about 400° C. The dust processing temperature is a temperature below an ignition temperature of the dust, which is typically from about 175° C. to about 300° C. In various examples, the dust processing temperature is less than about 100° C. In some examples, the dust processing temperature is about 50° C. By cooling the dust to a dust processing temperatures below an ignition temperature of the dust, the risk of dust fires is reduced or eliminated.

In various examples, the cooled conveyor may be any of suitable type of conveyor configured to receive dust from the cyclone 104 and reduce the temperature of the dust from the cyclone temperature to a dust processing temperature, as described in detail below. In the examples shown in FIGS. 1-6, the cooled conveyors 124 and 524 are screw conveyors. However, in various other examples, the conveyor may be a bucket conveyor, vibratory conveyor, or various other types of conveyors suitable for receiving the dust from the cyclone 104. In some examples, the decoating system 100 may include a plurality of conveyors, which may or may not be the same type of conveyor. In other examples, various other devices or components that can cool the dust may be used in addition to the cooled conveyor or without the cooled conveyor. As one non-limiting example, in some cases, various mixers, such as a ribbon mixer, with various cooling features may be used in place of or in addition to the cooled conveyor.

Referring to FIG. 1, in some examples, the conveyor 124 is a screw conveyor that includes a screw 126 and a trough 128. During operation, the screw 126 rotates within the trough 128 to move dust within the trough. As described in detail below, in various examples, the screw 126 and/or the trough 128 are internally or externally cooled through water-based, glycol-based, petrochemical-based, biologically-based, and/or molten salt-based coolants, water, ethylene glycol, oils, nitrogen or other gas, or other fluid coolants to provide cooled surfaces that contact the dust. By providing cooled surfaces, heat from the dust is transferred to the screw 126 and/or the trough 128, and the temperature of the dust is reduced.

While the conveyor 124 illustrates one screw 126 within the trough 128, the number of screws 126 within the trough 128 should not be considered limiting on the current disclosure. For example, in some examples, multiple screws 126 may be provided within the trough 128 (see FIG. 5). In these examples, the length of the trough 128 may be reduced while the width of the trough 128 may be increased to accommodate the multiple screws 126. In this way, the configuration/dimensions of the conveyor 124 can be modified as needed. In addition, while a single conveyor 124 is illustrated with the decoating system 100, the number of conveyors 124 can vary. For example, in some examples, multiple conveyors 124 may be provided in various configurations, such as a sequential, zig-zag or switch-back configuration (see FIG. 6), among other configurations. In further examples, the decoating system 100 optionally includes fans or other similar air movers to direct air on the conveyor 124 to further cool the dust. In various examples, the number and/or configuration of the screws 126 and/or conveyors 124 are provided to form a compact system with a reduced footprint within the decoating system 100.

In some examples, the decoating system 100 optionally includes sprayers or other injectors at various locations along the conveyor 124 that are configured to inject a reduced amount of water or other liquid or solid coolant into the dust in the conveyor 124. In such examples, the water is injected in an amount sufficient to help, in combination with the cooled conveyor 124, reduce the dust from the discharge temperature to the dust processing temperature, but not enough to create a slurry mixture with the dust.

In various examples, the decoating system 100 includes an introducer that is configured to inject predetermined amounts of a cooling material into the conveyor 124 along with the dust to further help cool the dust. In various examples, the cooling material may be inert materials, although they need not be. For example, in some cases, the cooling material that may be injected into the conveyor 124 with the dust includes materials that are inert or not inert. For example, the cooling materials includes, but is not limited to, various salts, sodium bicarbonate, sand, rock dust, metal shot, crushed stone, dross dust, cement kiln dust, lime, drop dust, sand, and various other suitable materials that may help cool the dust. In examples where the cooling material is injected into the conveyor 124 with the dust, the cooling material may optionally be separated from the dust downstream with a separator, depending on additional processing of the cooled dust (if any).

Figure 2:
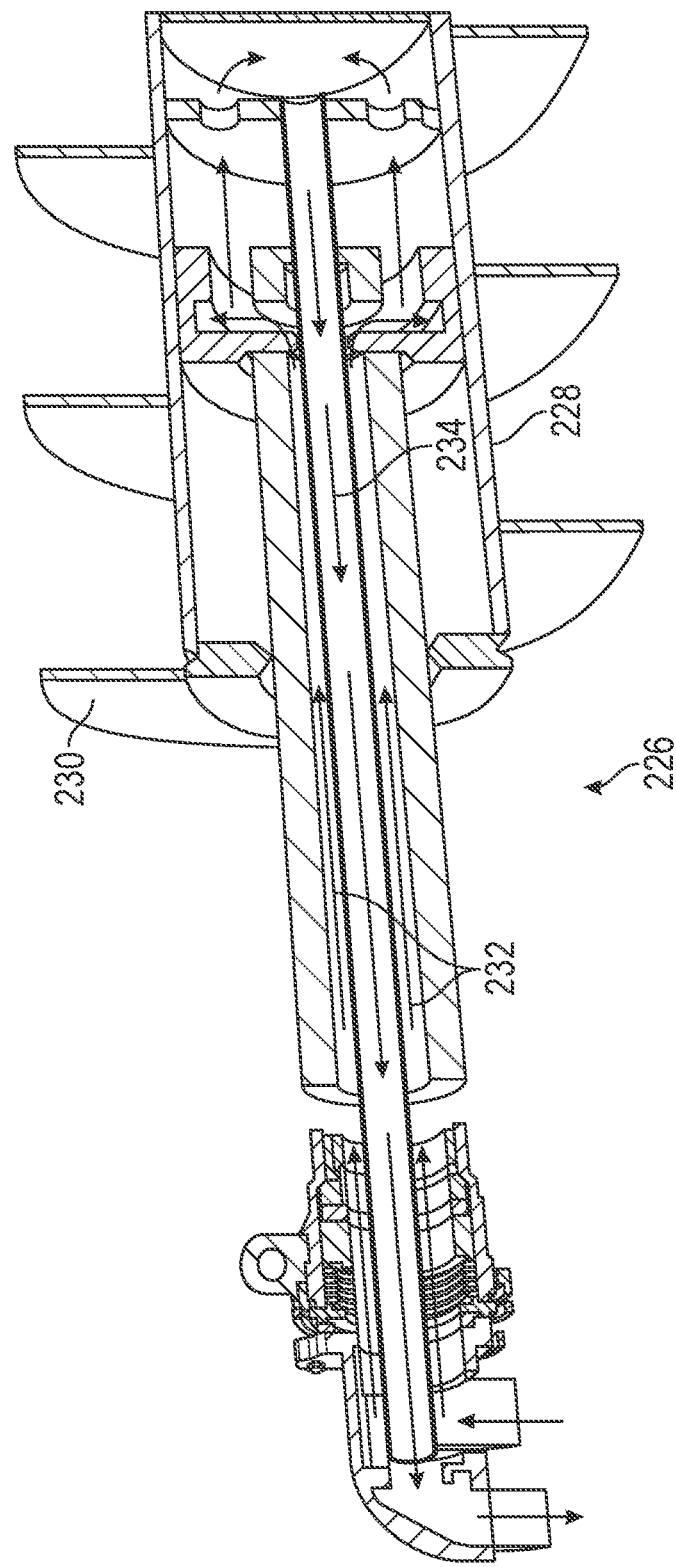
FIG. 2 is a sectional view of a portion of an exemplary cooled screw conveyor for use with the decoating system of FIG. 1.

FIG. 2 illustrates an example of a screw 226 that is internally cooled with a coolant and may be used with the cooled conveyor 124 of FIG. 1. As illustrated in FIG. 2, the screw 226 includes a hollow body 228 having helical flights 230. A coolant at a lower temperature than the dust is introduced into the hollow body 228 as indicated by arrow 232. As the coolant flows through the hollow body 228, the temperature of the coolant increases due to contact of the screw 226 with the dust and the temperature of the dust decreases due to contact with the low temperature coolant. The heated coolant is then directed from the hollow body 228 as indicated by arrow 234. Although not illustrated in FIG. 2, the heated coolant may be subsequently cooled through a heat exchanger after leaving the hollow body 228 such that the coolant may be recirculated back to the screw 226.

Figure 3:
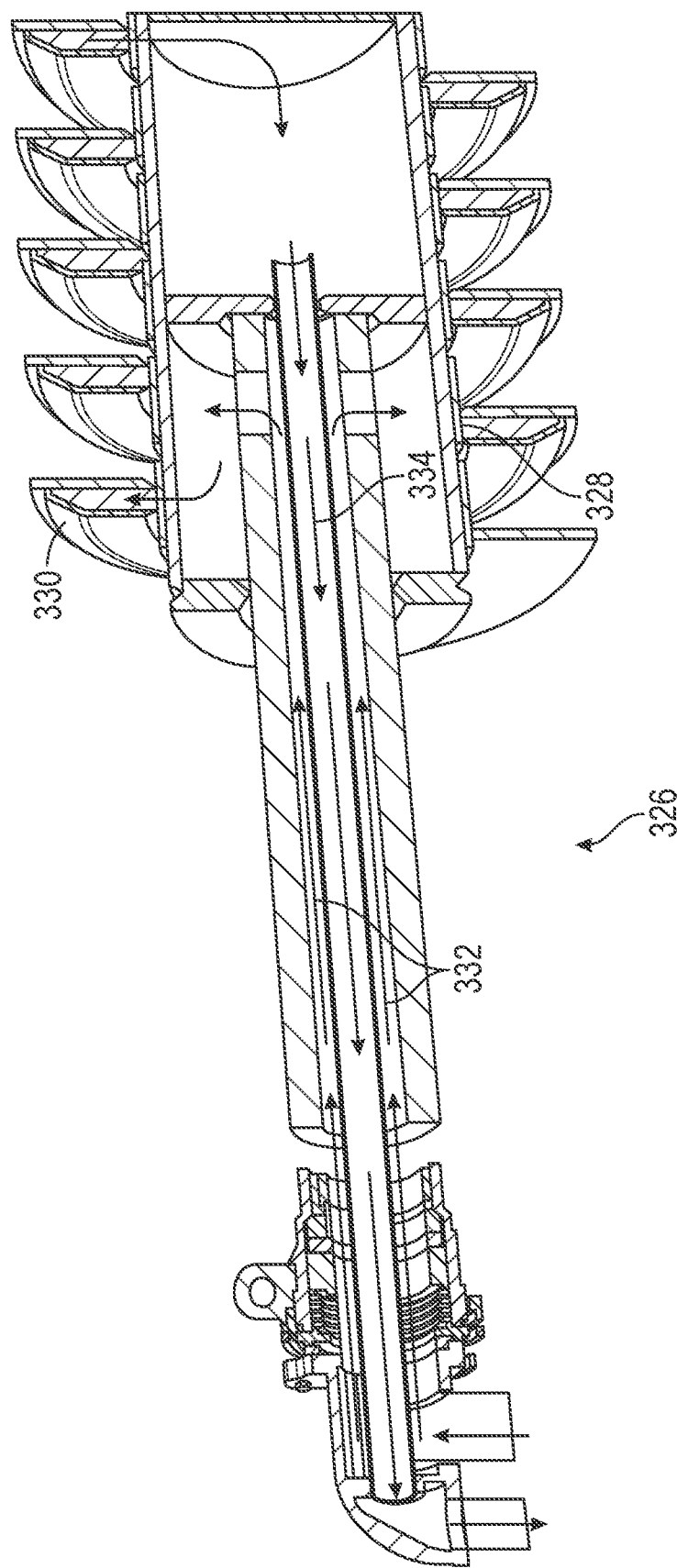
FIG. 3 is a sectional view of a portion of another cooled screw conveyor for use with the decoating system of FIG. 1.

FIG. 3 illustrates another example of a screw 326 that is internally cooled with a coolant and may be used with the cooled conveyor 124 of FIG. 1. Similar to the screw 226, the screw 326 includes a hollow body 328. In addition, to the hollow body 328, the screw 226 further includes hollow flights 330. Compared to the screw 226, during operation, the screw 326 provides an increased cooled surface area that comes in contact the dust because both the hollow body 328 and the flights 330 are cooled.

Similar to the screw 226, during operation of the screw 326, a coolant at a lower temperature than the dust is introduced into the hollow body 328 as indicated by arrow 332 is then directed through the screw 326 as indicated by arrow 334. From the hollow body 328, the coolant is directed to the hollow flights 330. As the coolant flows through the hollow body 328 and the screw 326 advances the dust, the temperature of the coolant in the flights 330 and/or the hollow body 328 increases due to contact with the dust, and the temperature of the dust decreases. The heated coolant is then directed from the flights 330 and the hollow body 228 as indicated by arrow 324. Similar to the screw 226, the heated coolant from the screw 326 may be subsequently cooled through a heat exchanger and recirculated back to the screw 326.

Figure 4:
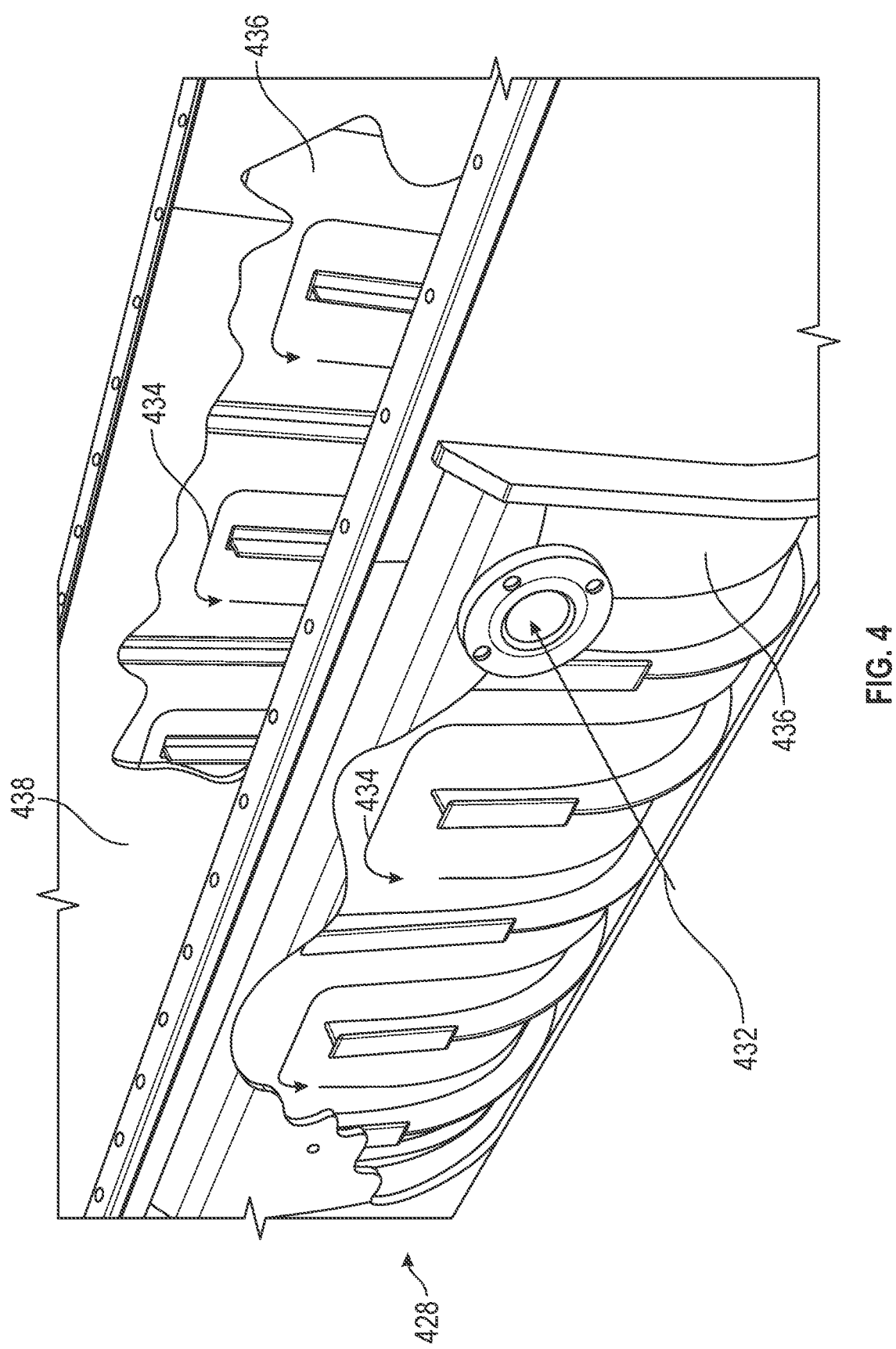
FIG. 4 is a sectional view of a portion of a jacket of a screw conveyor for use with the decoating system of FIG. 1.
Figure 6:
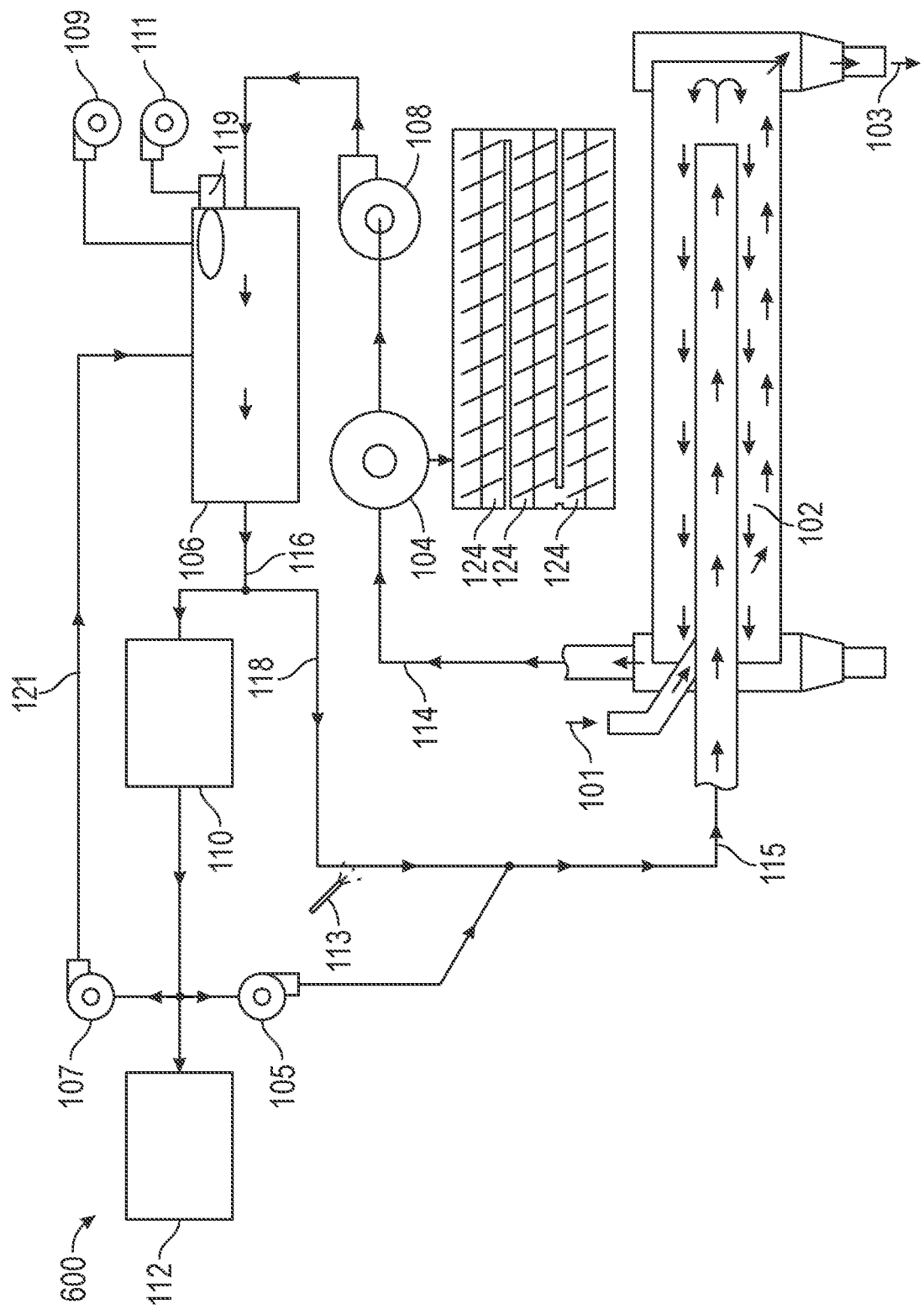
FIG. 6 is a schematic diagram depicting another decoating system including a cooled screw conveyor according to aspects of the present disclosure.

FIG. 4 illustrates an example of a trough 428 that is internally cooled with a coolant and may be used with the cooled conveyor 124 of FIG. 1. As illustrated in FIG. 6, the trough 428 defines internal passages 436 for the coolant to flow such that dust that comes into contact with a surface 438 during operation is cooled. Similar to the screws 226 and 326, heated coolant from the trough 428 may be cooled through a heat exchanger and recirculated back to the trough 428. In various examples, the trough 428 may be used with a traditional screw that is not internally cooled. In other examples, the trough 428 may be used with the internally cooled screw 226 or 326 (or other internally cooled screws) such that heat is removed from the dust by both the screw 226 or 326 and the trough 428. Optionally, the coolant may be introduced into the trough 428 as indicated by arrow 432 is then directed through the passages 436 as indicated by arrow 434.

Figure 5:
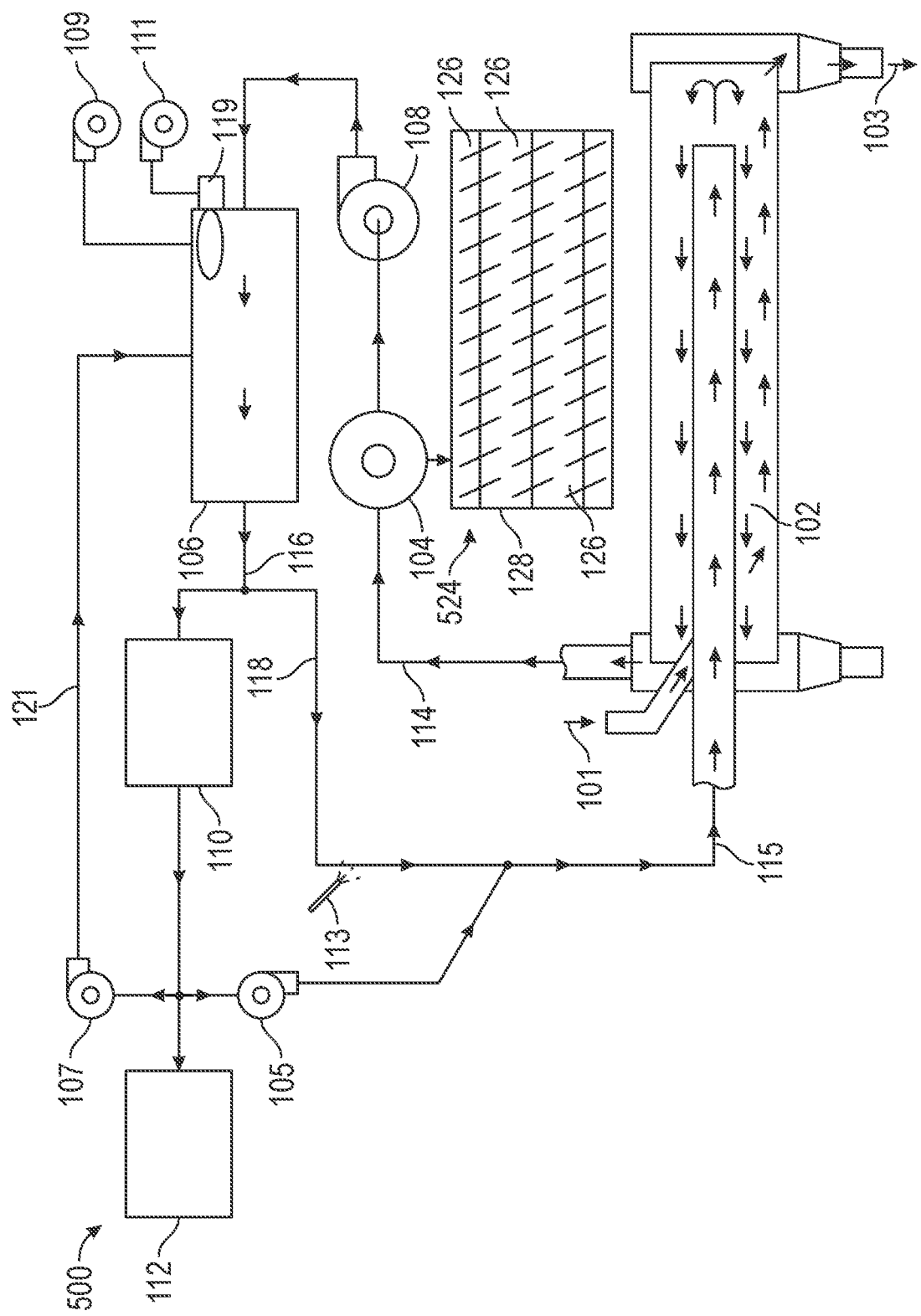
FIG. 5 is a schematic diagram depicting another decoating system including a cooled screw conveyor according to aspects of the present disclosure.

FIG. 5 illustrates an example of a decoating system 500 that is substantially similar to the decoating system 100 except that the decoating system 500 includes a conveyor 524 with multiple screws 126 within the trough 128. FIG. 6 illustrates an example of a decoating system 600 that is substantially similar to the decoating system 100 except that the decoating system 600 includes multiple conveyors 124. Numerous other configurations may be implemented. In certain examples, the trough and/or conveyor may be internally or externally cooled, and the trough and/or conveyor may define internal or external passages for the coolant to flow.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A decoating system comprising: a dust cyclone configured to: receive an exhaust gas from a decoating kiln; filter organic particulate matter from the exhaust gas as dust; and discharge the dust at a cyclone discharge temperature; and a cooled conveyor comprising a screw rotatably positioned in a trough, wherein at least one of the screw or the trough is internally cooled with a coolant, and wherein the cooled conveyor is configured to: receive the dust from the dust cyclone; and cool the dust to a dust processing temperature that is less than the cyclone discharge temperature.

EC 2. The decoating system of any of the preceding or subsequent example combinations, wherein the cyclone discharge temperature is from about 250° C. to about 400° C., and wherein the dust processing temperature from about 50° C. to about 150° C.

EC 3. The decoating system of any of the preceding or subsequent example combinations, wherein the dust processing temperature is less than about 120° C.

EC 4. The decoating system of any of the preceding or subsequent example combinations, wherein the dust processing temperature is less than about 100° C.

EC 5. The decoating system of any of the preceding or subsequent example combinations, wherein the dust processing temperature is less than about 80° C.

EC 6. The decoating system of any of the preceding or subsequent example combinations, wherein the dust processing temperature is about 50° C.

EC 7. The decoating system of any of the preceding or subsequent example combinations, wherein the dust processing temperature is less than an ignition temperature of the dust.

EC 8. The decoating system of any of the preceding or subsequent example combinations, wherein the ignition temperature is from about 175° C. to about 300° C.

EC 9. The decoating system of any of the preceding or subsequent example combinations, wherein both the screw and the trough of the cooled conveyor are internally or externally cooled with the coolant.

EC 10. The decoating system of any of the preceding or subsequent example combinations, wherein the coolant is a fluid.

EC 11. The decoating system of any of the preceding or subsequent example combinations, wherein the coolant is at least one of water-based, glycol-based, petrochemical-based, biologically-based and/or molten salt-based coolants, water, ethylene glycol, or oil.

EC 12. The decoating system of any of the preceding or subsequent example combinations, wherein the screw comprises a hollow body and at least one helical flight extending from the hollow body, and wherein the screw is configured to receive the coolant within the hollow body to cool an outer surface of the hollow body that contacts the dust during operation.

EC 13. The decoating system of any of the preceding or subsequent example combinations, wherein the helical flight is a hollow helical flight in fluid communication with the hollow body, and wherein the screw is configured to receive the coolant within the hollow helical flight to cool an outer surface of the hollow helical flight that contacts the dust during operation.

EC 14. The decoating system of any of the preceding or subsequent example combinations, wherein the trough defines internal passages configured to receive the coolant within the internal passages to cool a surface of the trough that contacts the dust during operation.

EC 15. The decoating system of any of the preceding or subsequent example combinations, wherein the cooled conveyor is a first cooled conveyor, wherein the decoating system comprises a plurality of cooled conveyors, and wherein each cooled conveyor or the plurality of cooled conveyors comprises a screw rotatably positioned in a trough.

EC 16. The decoating system of any of the preceding or subsequent example combinations, wherein the screw is a first screw, and wherein the cooled conveyor comprises a plurality of screws rotatably positioned in the trough.

EC 17. The decoating system of any of the preceding or subsequent example combinations, further comprising an introducer configured to inject a cooling material into the dust within the cooled conveyor.

EC 18. The decoating system of any of the preceding or subsequent example combinations, wherein the cooling material comprises at least one of rock dust, metal shot, crushed stone, dross dust, cement kiln dust, lime, salt, sodium bicarbonate, sand, and drop dust.

EC 19. A method of cooling dust containing organic particulate matter from a dust cyclone of a decoating system comprising: extracting the dust from the dust cyclone of the decoating system and into a cooled conveyor comprising a screw rotatably positioned in a trough, wherein at least one of the screw or the trough is internally cooled with a coolant; and advancing the dust along the trough with the screw and cooling the dust from a cyclone discharge temperature to a dust processing temperature with the cooled conveyor.

EC 20. The method of any of the preceding or subsequent example combinations, wherein the cyclone discharge temperature is from about 250° C. to about 400° C., and wherein the dust processing temperature is from about 50° C. to about 150° C.

EC 21. The method of any of the preceding or subsequent example combinations, wherein the dust processing temperature is less than an ignition temperature of the dust.

EC 22. The method of any of the preceding or subsequent example combinations, wherein the ignition temperature is from about 175° C. to about 300° C.

EC 23. The method of any of the preceding or subsequent example combinations, wherein the coolant is a fluid.

EC 24. The method of any of the preceding or subsequent example combinations, wherein the coolant comprises at least one of water-based, glycol-based, petrochemical-based, biologically-based and/or molten salt-based coolants, water, ethylene glycol, or oil.

EC 25. The method of any of the preceding or subsequent example combinations, wherein cooling the dust further comprises: circulating the coolant through a hollow body of the screw and cooling an external surface of the hollow body; and contacting the external surface of the hollow body with the dust.

EC 26. The method of any of the preceding or subsequent example combinations, wherein cooling the dust further comprises: circulating the coolant through a hollow helical flight of the screw in fluid communication with the hollow body and cooling an external surface of the hollow helical flight; and contacting the external surface of the hollow helical flight with the dust.

EC 27. The method of any of the preceding or subsequent example combinations, wherein cooling the dust further comprises: circulating the coolant through an internal or external passage of the trough to cool a surface of the trough; and contacting the cooled surface of the trough with the dust.

EC 28. The method of any of the preceding or subsequent example combinations, further comprising injecting with an introducer a cooling material into the dust in the cooled conveyor.

EC 29. The method of any of the preceding or subsequent example combinations, wherein the cooling material comprises at least one of rock dust, cement kiln dust, metal shot, crushed stone, dross dust, lime salt, sodium bicarbonate, sand, or drop dust.

EC 30. The method of any of the preceding or subsequent example combinations, wherein the cooling material comprises an inert material.

EC 31. A decoating system comprising: a dust cyclone configured to: receive an exhaust gas from a decoating kiln; filter organic particulate matter from the exhaust gas as dust; and discharge the dust at a cyclone discharge temperature; and a cooled conveyor configured to: receive the dust from the dust cyclone; and cool the dust to a dust processing temperature that is less than the cyclone discharge temperature.

EC 32. The decoating system of any of the preceding or subsequent example combinations, wherein the cyclone discharge temperature is from about 250° C. to about 400° C., and wherein the dust processing temperature from about 50° C. to about 150° C.

EC 33. The decoating system of any of the preceding or subsequent example combinations, wherein the dust processing temperature is less than about 120° C.

EC 34. The decoating system of any of the preceding or subsequent example combinations, wherein the dust processing temperature is less than about 100° C.

EC 35. The decoating system of any of the preceding or subsequent example combinations, wherein the dust processing temperature is less than about 80° C.

EC 36. The decoating system of any of the preceding or subsequent example combinations, wherein the dust processing temperature is about 50° C.

EC 37. The decoating system of any of the preceding or subsequent example combinations, wherein the dust processing temperature is less than an ignition temperature of the dust.

EC 38. The decoating system of any of the preceding or subsequent example combinations, wherein the ignition temperature is from about 175° C. to about 300° C.

EC 39. The decoating system of any of the preceding or subsequent example combinations, wherein the cooled conveyor comprises a trough, and wherein the trough is internally or externally cooled with a coolant.

EC 40. The decoating system of any of the preceding or subsequent example combinations, wherein the cooled conveyor comprises at least one of a screw conveyor, a troughed belt conveyor, a bucket conveyor, a pneumatic conveyor, or a vibrating conveyor.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A decoating system comprising:
   a dust cyclone configured to:
      receive an exhaust gas from a decoating kiln;
      filter organic particulate matter from the exhaust gas as dust; and
      discharge the dust at a cyclone discharge temperature; and
   a cooled conveyor comprising a screw rotatably positioned in a trough, wherein at least one of the screw or the trough is internally cooled with a coolant, and wherein the cooled conveyor is configured to:
      receive the dust from the dust cyclone; and
      cool the dust to a dust processing temperature that is less than the cyclone discharge temperature.

2. The decoating system of claim 1, wherein the cyclone discharge temperature is from about 250° C. to about 400° C., and wherein the dust processing temperature from about 50° C. to about 150° C.

3. The decoating system of claim 2, wherein the dust processing temperature is less than an ignition temperature of the dust.

4. The decoating system of claim 1, wherein both the screw and the trough of the cooled conveyor are internally or externally cooled with the coolant.

5. The decoating system of claim 1, wherein the screw comprises a hollow body and at least one helical flight extending from the hollow body, and wherein the screw is configured to receive the coolant within the hollow body to cool an outer surface of the hollow body that contacts the dust during operation.

6. The decoating system of claim 5, wherein the helical flight is a hollow helical flight in fluid communication with the hollow body, and wherein the screw is configured to receive the coolant within the hollow helical flight to cool an outer surface of the hollow helical flight that contacts the dust during operation.

7. The decoating system of claim 1, wherein the trough defines internal or external passages configured to receive the coolant within the internal passages to cool a surface of the trough that contacts the dust during operation.

8. The decoating system of claim 1, wherein the cooled conveyor is a first cooled conveyor, wherein the decoating system comprises a plurality of cooled conveyors, and wherein each cooled conveyor or the plurality of cooled conveyors comprises a screw rotatably positioned in a trough.

9. The decoating system of claim 1, wherein the screw is a first screw, and wherein the cooled conveyor comprises a plurality of screws rotatably positioned in the trough.

10. The decoating system of claim 1, further comprising an introducer configured to inject a cooling material into the dust within the cooled conveyor.

11. A decoating system comprising:
    a dust cyclone configured to:
       receive an exhaust gas from a decoating kiln;
       filter organic particulate matter from the exhaust gas as dust; and
       discharge the dust at a cyclone discharge temperature; and
    a cooled conveyor configured to:
       receive the dust from the dust cyclone; and
       cool the dust to a dust processing temperature that is less than the cyclone discharge temperature.

12. The decoating system of claim 11, wherein the cyclone discharge temperature is from about 250° C. to about 400° C., and wherein the dust processing temperature from about 50° C. to about 150° C.

13. The decoating system of claim 12, wherein the dust processing temperature is less than an ignition temperature of the dust.

14. The decoating system of claim 11, wherein the cooled conveyor comprises a trough, and wherein the trough is internally or externally cooled with a coolant.

15. The decoating system of claim 11, wherein the cooled conveyor comprises at least one of a screw conveyor, a troughed belt conveyor, a bucket conveyor, a pneumatic conveyor, or a vibrating conveyor.

\* \* \* \* \*